Fig. 1

ALEXANDER BARRY
INVENTOR.

ATTORNEY

Fig. 2

ALEXANDER BARRY
INVENTOR.

ATTORNEY

United States Patent Office 3,126,151
Patented Mar. 24, 1964

3,126,151
COURSE CORRECTOR
Alexander Barry, 21—55 71st St., East Elmhurst, N.Y.
Filed Aug. 17, 1960, Ser. No. 50,197
10 Claims. (Cl. 235—78)

This invention relates to navigation equipment for use with small water craft, and is particularly directed to a course corrector for use in conjunction with magnetic compasses in such small craft.

In the usual magnetic compass for use in small water craft, the compass, which is magnetically controlled is subject to two errors, which vary with the geographical area in which the vessel is operated, and the magnetic conditions in the vessel or craft itself.

Due to the fact that the magnetic north and south poles of the earth do not coincide with the true geographical north and south poles, the compass reading, which, aside from other errors, normally gives a magnetic pole reading, differs to some extent from the true, or geographical north pole, which is the direction generally required for navigation.

This variation error is generally established for various points on the earth's surface by governmental bodies, such as the U.S. Geodetic Survey and is published in the form of charts, showing these compass variation corrections required at various points on the earth's surface, with particular reference to the particular geographical areas in which the craft under consideration is to be operated.

In addition to this error, each magnetic compass is subject to an additional error, which is due primarily to magnetic conditions in the physical area in the vessel, in which the compass is mounted.

This error, which is called compass deviation, is due to magnetic influences in the craft itself, which may be caused by magnetic fields set up by electrical machines, such as motors, generators and the like, or electronic equipment, and the presence of quantities of magnetic metals, such as iron and steel in the structure of the vessel, all of which tend to set up stray magnetic fields, which tend to draw the indicator of a magnetic compass away from the normal position it would assume, if such magnetic influences were eliminated and the compass were controlled by the magnetic fields of the earth exclusively.

This magnetic influence which is known as deviation is relatively consistent in a vessel, unless major changes in location of the compass, the structure of the vessel, or the electrical equipment located therein or used in conjunction therewith, are made.

This magnetic influence, or deviation may be determined at the time the magnetic compass is installed, and remains substantially constant for long periods of time.

In order to navigate a vessel according to the geographical poles of the earth, it is necessary for a navigator to correct the normal magnetic readings by the extent of the variation and the deviation errors affecting a particular compass, in a designated area.

It is thus necessary for the navigator to read the magnetic compass indication and convert by computation to the required true geographical direction incorporating with the actual readings the variation error, which may be additional or subtractive, depending upon whether the direction of the correction is east or west, from a suitable chart, and to further incorporate the deviation error, which may also be additional or subtractive, depending upon whether its direction is east or west, using the known error. This provides a compass reading which must be followed in order for the vessel to follow a geographical course required in order to approach the destination of the vessel.

Unless suitable computation equipment is available for the purpose, this computation may be confusing, due to the positive and negative signs involved, depending upon east and west directions, and unless the navigator is experienced in computations of this type, frequently results in navigational errors, which may send the vessel off its proper course over considerable distances, or result in going aground, thus resulting in a substantial increase in the time required in travelling to a particular destination.

The primary feature of this invention is that it enables the operator or navigator of a vessel to rapidly and accurately convert any nominal reading of the magnetic compass, to a true compass reading, or the reverse procedure, after the appropriate variation error and deviation error are introduced.

Thus, by setting the device with the applicable variation and deviation error, the apparatus becomes a conversion device, which yields a corrected true course reading for any magnetic compass reading and inversely yields the required magnetic compass course to steer by for any desired true compass course.

Another feature of the device is that no mathematical computation is required, the corrected compass reading being readily obtainable on a multiple dial device, by setting up the true course reading, the variation error, and the deviation error, and thus obtaining a direct reading of the corrected compass course reading to be followed.

Fundamentally the device includes a plurality of concentric ring dials, all of which gives compass readings from 0 degrees to 360 degrees, the second dial introducing a correction due to compass variation, the third dial ring being utilized to introduce the correction due to compass deviation, regardless of sign, or direction. When the second and third dial rings are oriented to represent the compass errors, of variation and deviation, of a locality, a true course reading can be converted to its magnetic compass course reading, or the reverse procedure may be followed.

Another feature of the device is that it can be utilized for all compass positions from zero to 360°, and may be utilized to introduce variation and deviation corrections from zero to approximately 30°, which is the normal maximum correction required, except when navigating at points near the magnetic poles of the earth, the corrections being introduced regardless of the direction or sign of the error or combination of errors.

Another feature of the device is that angle stops or limits are provided to control the correction dials, to limit the rotational angular movement of each of said dials to the normal maximum error correction, regardless of the compass position with which it is used.

Another feature of the device is that pivot support means is provided in some of the dials to retain the movable or correction dials in their proper concentric relation to the outer, or fixed dial at all times, regardless of the compass position, at which a corrected reading is to be taken.

The accompanying drawings, illustrative of one embodiment of the invention, and several modifications thereof, together with the description of their construction and the method of support, control and operation thereof, will serve to clarify further objects and advantages of the invention.

It will be understood that the following description of the construction and the method of operation and utilization of the course corrector is intended as explanatory of the invention and not restrictive thereof.

In the drawings, the same references numerals designate the same parts through the various views, except where otherwise indicated.

Figure 1:
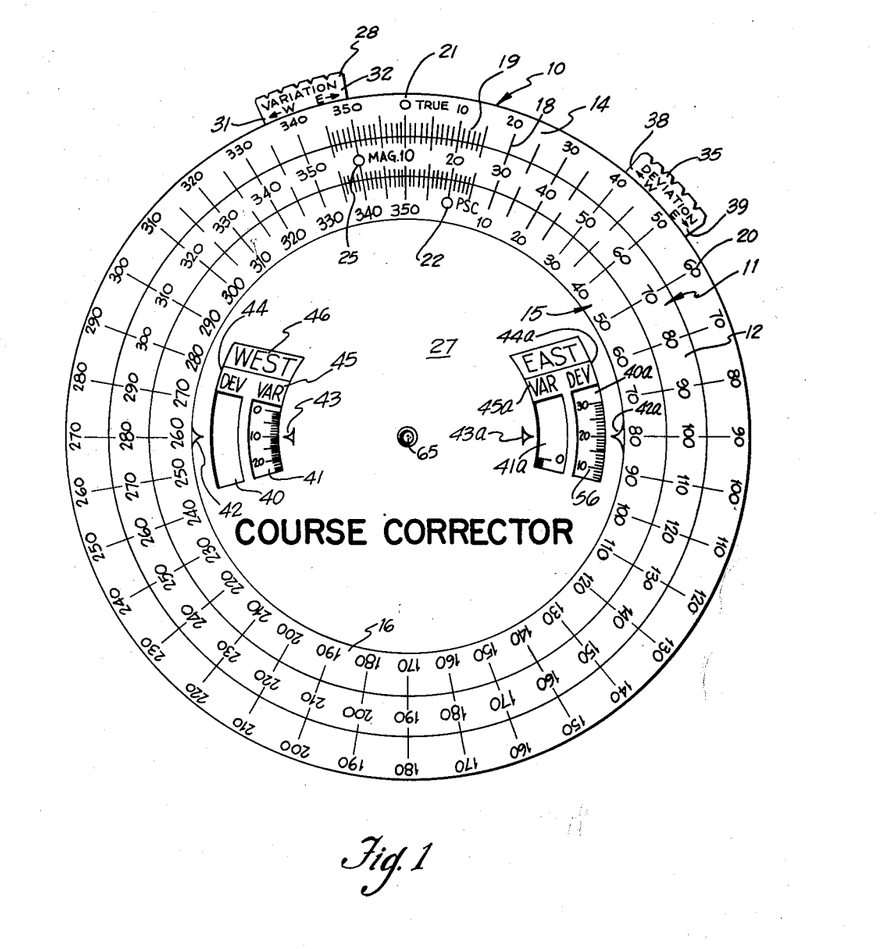
FIGURE 1 is a plan view of one embodiment of the assembled course corrector device, with the dial rings located in one adjusted position, relative to one another, the device being equipped with the two pairs of radial cut-outs to indicate the corrections applied.

One embodiment of the course corrector shown in FIGURE 1, comprises an outer dial ring and disc combination 10, an intermediate dial ring and disc combination 11, having an intermediate dial ring 12, located inside and concentric with the outer dial ring 14, and an inner dial ring and disc combination 15, the inner dial ring 16 of which is fitted to and concentric with the intermediate dial ring 12.

The outer dial ring 14 shown in FIGURE 1, which is the True Course dial, is divided around the outer circumference thereof into a plurality of 10 degree graduations 18 and intermediate individual degree, or fractional degree graduations 19, numerals 20, being located at each 10 degree graduation, or other suitable divisions.

An indicating marker 21 is located at the zero position on the outer dial ring, a similar marker 22, being located at the zero position on the inner dial ring as well as a similar marker 25 located in the intermediate dial rings.

The intermediate dial ring 12 is graduated through the same angular graduations as the outer dial ring, so that when the zero markers coincide, the angular markings and the graduations coincide with one another.

The intermediate dial ring is also graduated from 0° to 360°, the graduations coinciding with the graduations on the outer dial ring. The numerals from 0° to 360° are also substantially the same as, and radially aligned with the graduations and numerals on the outer dial ring.

As the usual range of angular variation correction is of the order of not over 30° east, or west, the maximum rotational movement of the intermediate dial ring 12 relative to the outer dial ring 14 may be limited to 30° in either direction from the central marker 21, stops to limit the movement of the inner and intermediate dial rings being constructed in a manner hereinafter described in greater detail.

In order to accurately align the intermediate dial ring, with the outer dial ring, when there is no variation correction to be made, a zero marker 25, of a form corresponding to the zero marker on the outer dial ring, is printed or engraved at the zero position on the intermediate dial ring.

In order to move the intermediate dial ring and the central disc 27, which is fixedly attached to the intermediate dial ring, and forms part of the intermediate ring and disc combination 11, a radially positioned tab 28 is glued or otherwise fixedly attached to the intermediate dial ring, the tab extending radially outward beyond the outer dial ring 14, as shown in FIGURE 1.

Figure 7:
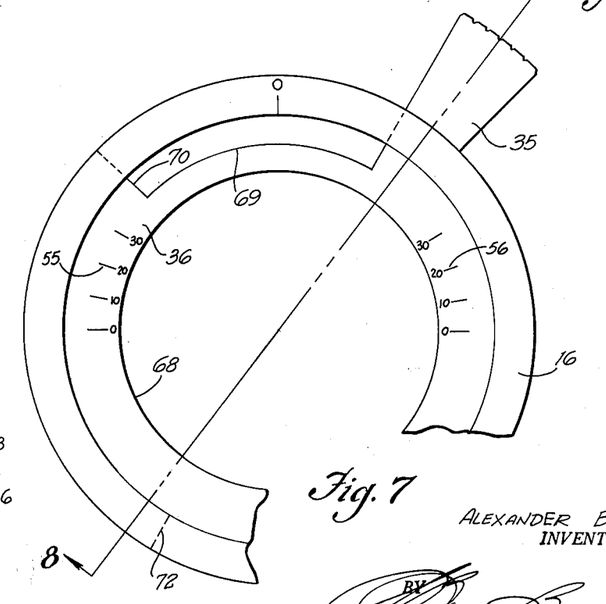
FIGURE 7 is a plan view of the inner dial ring and disc combination, shown in FIGURE 1.

In the construction shown in FIGURES 1 and 7, the radial tab 28, is located between the base disc 57, and the outer dial ring 14, which is of substantially circular form and of a diameter substantially equal to the outer diameter of the base disc 57, a separator ring 59, the thickness of which is substantially equal to the thickness of the tab 28, being inserted between the outer dial ring and the base disc, the separator ring extending from the radial line 60, to the radial line 61, which serve as stops to limit the angular movement of the radial tab 28, the tab extending beyond the outer diameter of the outer dial ring.

The space between the outer dial ring and the base disc, allows the tab 28 to be moved through an angular range limited by the two stops 60, 61.

Stops may be provided to limit the angular movement of the radial tab 28 and consequently the rotational movement of the intermediate disc and ring combination in a manner hereinafter described.

In order to indicate to the user the selection of the radial tab 28 and the direction of movement thereof, the word "VARIATION" may be printed, engraved or otherwise reproduced on the radial tab 28, the letters W and E being respectively designated at the left-hand and right-hand sides of the center, respectively, to indicate east and west corrections respectively, as shown in FIGURE 1, with arrows 31, 32, located adjacent the E and W designations, the arrows indicating the direction of rotational movement corresponding to east or west variation corrections.

The inner dial ring 16 is graduated through the same angular range and in substantially the same graduation spacing as the outer dial ring 14.

The inner dial ring 16 is also graduated from 0° to 360° in the same manner as the outer dial ring 14, the individual graduations coinciding substantially with the graduations on the outer dial ring 14.

The usual range of angular deviation corrections is similar to that of the intermediate or variation disc, or of the order of not over 30° east or west. The maximum rotational angular movement of the inner dial ring 16, relative to the intermediate dial ring 12 may be limited to 30° in either direction, from the central marker 25 of the intermediate dial ring, the stops being constructed in a manner hereinafter described.

A zero marker 22 is indicated at the point on the inner dial ring 16, in a manner similar to that on the outer dial ring, the marker 22 coinciding angularly with the zero marker on the intermediate dial ring, when there is no deviation correction.

A radially positioned tab 35, which is integral with or attached to an annular backing disc 36, which is attached to the inner dial ring 16 projects, radially outwardly beyond the outer circumference of the outer dial ring, the outer radius of the radial tab 35 being substantially the same as that of the variation tab.

The deviation tab is located in substantially the same flat plane as the variation tab 28, the deviation tab being located between the base disc 57, and the rear surface of the outer dial ring, and the intermediate dial ring.

Stops are provided to limit the rotational angular movement of the inner dial ring, relative to the intermediate dial ring 12, thus controlling the limits of the rotation of the inner ring and disc combination, in a manner hereinafter described.

The word "DEVIATION" is printed, engraved, or otherwise reproduced on the outer face of the tab, in a manner similar to the variation tab 28, shown in FIGURE 1.

The letters E and W are also reproduced at the left and right-hand side of the center of the deviation tab 35, in the same manner as the variation tab 28.

The arrows 38, 39 co-ordinated with the letters E and W are also provided to indicate the direction of movement of the tab and the dial ring to which it is attached, in the same manner as the variation tab 28.

In order to indicate the degrees of correction for both variation and deviation at any position of the intermediate and inner dial ring, two pair of diametrically aligned circular segmental openings or cut-outs 40, 41, may be cut through the outer central disc 27, which is attached to the intermediate dial ring 12.

Two pairs of arrows 42, 43 are printed or engraved on the surface of outer central disc, adjacent the inner and outer radial edges of the cut-outs 40, 41, to indicate the angular position of the correction on the printed or engraved graduation, located below the outer central disc in a manner hereinafter described.

The letters "Dev" 44, 44a are printed, or engraved on the surface of the outer central disc, adjacent the outer radial cut-outs 40, 40a, to indicate that the outer cut-outs designate the deviation corrections. Similarly, the letters "Var" 45, 45a, are printed or engraved adjacent the inner radial cut-outs 41, 41a, to indicate that these cut-outs indicate the angular position of the variation correction.

In addition to these designations, the word "West" 46, or a corresponding designation is located adjacent the left-hand cut-outs 40, 41, and a similar "East" designation adjacent the right-hand cut-outs 40a, 41a, to indicate that these cut-outs designate east corrections in both deviation and variation, and also west corrections in both deviation and variation.

Figure 3:
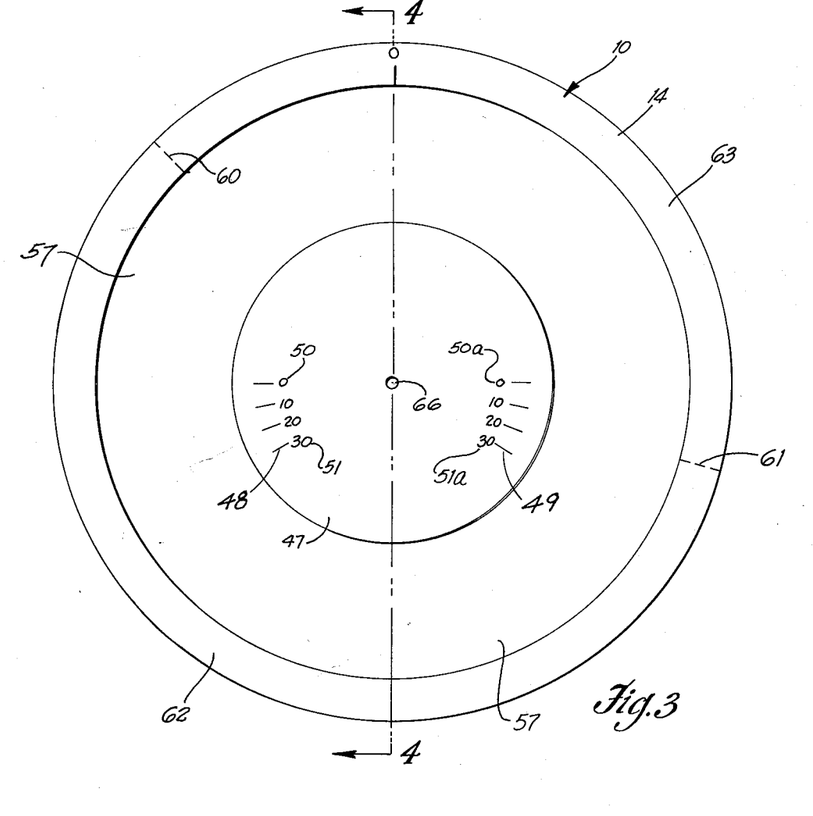
FIGURE 3 is a plan view of the fixed base disc and the outer dial ring combination of the device shown in FIGURE 1.

An inner flat central disc 47, shown in FIGURE 3, is attached to the upper surface of the base disc, two sets of graduations 48, 49, ranging from 0 to 30 degrees, in 1 degree intervals, with corresponding 0 degree to 30 degree designations 50, 51 printed or engraved on the outer surface of the inner central disc, in substantial alignment with the inner radial cut-outs 41, 41a, to indicate the angular position of the variation corrections.

The 0 degree designations 50, 50a, are diametrically aligned with one another, so that when the intermediate or variation dial ring is so positioned that the 0 degree designation on the intermediate dial ring, is aligned with the zero degree designation on the outer dial ring, the 0 degree graduations on the inner dial ring are aligned with the corresponding arrows 43, 43a adjacent the inner edges of the inner radial cut-outs 41, 41a.

When the intermediate dial ring 12 is rotated in a clockwise direction (East), the arrow 43a, adjacent the inner right-hand cut-out, progressively indicates an increasing angular designation until the arrow is aligned with the 30 degree graduation, which is the maximum easterly variation correction provided for.

When the intermediate dial ring 12 is rotated in a counterclockwise direction (West) from the zero position, the left-hand arrow 43 progressively points to an increasing angular graduation, until a maximum reading or 30 degrees westerly variation is reached.

At this point, a stop is reached in the rotational angular movement of the intermediate dial ring, thus limiting the rotational movement of the intermediate dial ring, and providing a maximum westward correction of 30 degrees.

Figure 8:
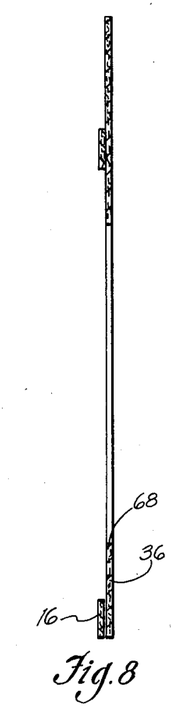
FIGURE 8 is a section through the inner dial ring and disc combination, shown in FIGURE 7, taken on the line 8—8, FIGURE 7.

The annular backing ring 36 is attached to the rear face of the inner dial ring 16, as shown in FIGURE 8.

Two sets of radially positioned graduations 55, 56, ranging from 0 degree to 30 degrees, are printed, or otherwise reproduced on the upper surface of the backing ring 36, in radial alignment with the outer radial cut-outs or deviation cut-outs 40, 40a, through the outer central disc 27.

The zero designations are diametrically aligned with the outer arrows 42, 42a, when the inner dial ring is located in its zero position.

The graduations 55, 56 range radially upward from the zero positions, as contrasted with the radially downward graduations on the inner central disc 47, which is attached to the base disc 57.

When the intermediate or variation dial ring is in its central position with the zero designation 25, on the intermediate dial ring, aligned with the zero designation 21 on the outer ring dial 14, the outer arrows 42, 42a, on the outer central disc 27 are aligned with the zero designations visible through the outer radial cut-outs 40, 40a.

As the intermediate dial ring is rotated clockwise (East), the angular designation visible through the right-hand inner cut-out 41a, progressively increases from 0 to a maximum angular correction of 30 degrees.

Similarly, as the intermediate dial ring is rotated in a counter-clockwise direction (West), the angular graduation visible through the left-hand inner cut-out 41 progressively increases from 0 degree to 30 degrees, at which point a stop is reached, this being the maximum variation correction provided for.

FIGURES 3, 4, 5, 6, 7, 8 show the detailed construction of the various ring and disc combinations shown in FIGURE 1.

Figure 4:
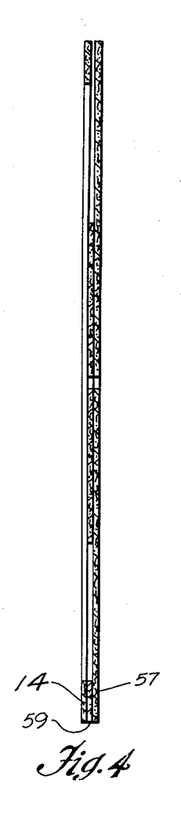
FIGURE 4 is a vertical section through the fixed disc and outer ring combination shown in FIGURE 3, taken on the line 4—4, FIGURE 3.

The outer ring and disc combination, shown in FIGURES 3 and 4, which may be made of paper, cardboard, or a sheet plastic material, is formed of several sections which are fastened to one another in a manner hereinafter described.

This combination consists of a circular base 57 and an outer dial ring 14, the diameter of which is substantially equal to that of the base.

A separator ring 59 is inserted between the base 57 and a portion of the outer dial ring, the separator ring, the thickness of which is substantially equal to the thickness of the tabs 28, 35, extending from the radial line 60, to the radial line 61, which serve as stops to limit the rotational angular movement of the two radial tabs 28, 35.

The circular segmental ring section, designated 62, in FIGURE 3, and extending along a circular arc from the radial ends 60, 61 of the separator section 59, is glued, or otherwise fixedly attached to the separator ring 59, which is in turn glued, or otherwise fixedly attached to one flat surface of the base 57.

The area designated 63, between the ends 60, 61 of the separator section is left free, to enable the tabs 28, 35 to be moved through an arcuate contour large enough to allow the intermediate dial ring and the inner dial ring to be moved through an angle large enough to allow a rotational angular movement of a maximum of 30 degrees from the 0 degree position in both directions.

Thus the line 60 serves as a stop to limit the angular movement of the variation tab through 30 degrees in a leftward or westerly direction.

The stop or line 61 allows the inner dial ring to be rotated through an angle 30 degrees eastward, relative to the intermediate dial ring 12, after the intermediate dial ring 12 has been moved through a 30 degree angle eastward, or right-hand, FIGURE 1, the tab 35 engaging the right-hand stop 61 to limit the rotational movement of the inner or deviation dial ring 16.

Figure 5:
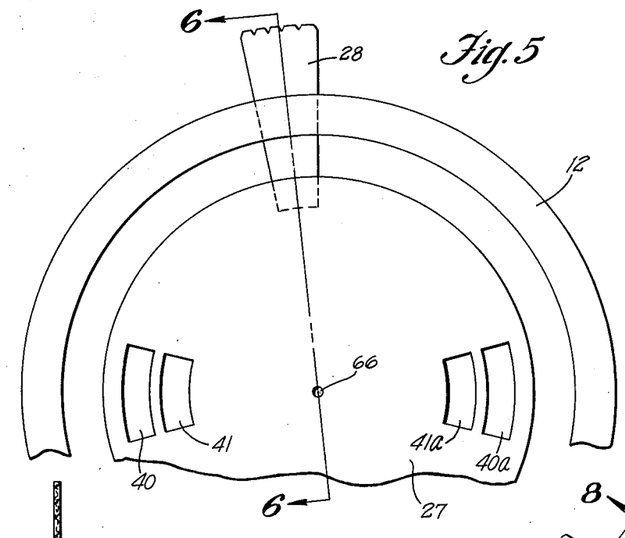
FIGURE 5 is a plan view of the intermediate dial ring and disc combination of the device shown in FIGURE 1.
Figure 6:
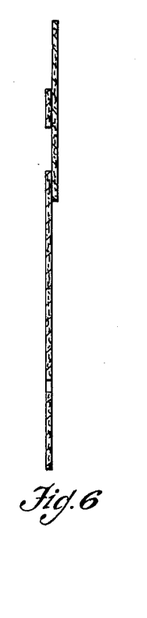
FIGURE 6 is a section through the intermediate dial ring and disc combination shown in FIGURE 5, taken on the line 6—6, FIGURE 5.

The intermediate dial ring combination, which is shown in detail in FIGURES 5 and 6, comprises an intermediate dial ring 12, which is concentric with and fits into the outer dial ring 14, and an outer central disc 27, which is concentric with the intermediate dial ring 12, the outer central disc being rotatably attached to the base disc 57 by a pivot or screw 65, which is fitted through the central opening 66, through the central disc 27, and an aligned opening through the base disc.

The radial variation tab 28, shown in FIGURES 1 and 5, is glued or otherwise fixedly attached to the under surface of the intermediate dial ring 12, and the outer central disc 27, thus causing the outer central disc to rotate with the intermediate dial ring 12, when the variation tab 28 is moved to introduce a variation correction in the manner hereinbefore described.

The two pair of radial cut-outs 40, 41, which are cut through the outer central disc 27, and which are employed to indicate the adjusted position of the intermediate and inner dial rings, are also shown in FIGURE 1, and were hereinbefore described in detail.

FIGURES 7 and 8 show the detailed construction of the inner dial ring combination shown in FIGURE 1.

This combination consists of an inner dial ring 16, which is concentric with and located inside the intermediate dial ring 12, in the assembled position shown in FIGURE 1, and is partially attached to an annular backing disc 36, the outer diameter of which is substantially equal to the outer diameter of the inner dial ring 16.

The annular backing disc 36 has a central opening 68 therethrough, the diameter of which is slightly larger than that of the inner central disc 47, thus enabling the annular backing disc to rotate directly against the face of the base disc 57.

The annular backing disc has a short circumferential segmental cut-out therethrough, the cut-out extending from a circular arc 69, to the outer circumference of the annular backing disc, through an area extending from a radial line 70, to the lefthand edge of the deviation tab 35.

The radial line 70 of the cut-out serves as a stop to limit the rotational movement of the variation tab 28 in one direction, thus limiting the rotational movement of the intermediate dial ring to 30 degrees in a westerly direction. In the opposite direction, the rotational angular movement of the intermediate dial ring 12 is limited by the engagement of one edge of the variation tab 28 with the edge of the deviation tab 35 which is located adjacent the cut-out.

The area of the inner dial ring extending from the radial line 72 to the left-hand edge of the deviation tab 35 is attached to the annular backing disc 36 by gluing or other suitable attaching means. The area of the inner dial ring 16, which extends from the left-hand portion of the inner dial ring 16, from the radial line 72 to the left-hand edge of the deviation tab 35, is left free, to enable the outer central disc 27 to be inserted therethrough into the assembled position, shown in FIGURE 1, with the outer circumference of the outer central disc 27 in engagement with the inner circumferential edge of the inner dial ring.

The graduations 55, 56 are printed, or engraved on the outer surface of the annular backing ring 36. The graduations 55, 56 which appear through the outer openings 40, 40a, through the outer central disc 27, were hereinbefore described.

The angular readings or designations indicated on the outer dial ring 14, are the "true course" readings, that is the true geographical directions, assuming the zero designation on the outer dial ring 14 is aligned with the north geographical pole, according to the map.

The angular reading and graduations given on the intermediate dial ring 12 are the magnetic course designations. This serves to indicate magnetic directions, assuming the zero designation on the intermediate dial ring is aligned with the north magnetic pole.

The angular designations on the inner dial ring give the compass course readings, corresponding to specific true course readings. These are the readings obtained by an operator, after the required variation correction, due to the vessel's position, relative to the earth's magnetic field, and the deviation correction, due to magnetic conditions in the vessel itself, are made.

The correction is introduced from the zero designation on the outer dial ring, the variation correction being introduced through the left or right-hand variation window, depending upon whether the correction is East or West. The deviation correction is also introduced at the corresponding outer left or right-hand deviation window, depending upon whether the correction is East or West.

The inner dial ring is now set at the corrected compass reading. By reading the required true course angle on the outer dial ring, a corresponding corrected position or compass course is obtained from the corresponding reading on the inner dial ring, or the reverse procedure may be followed.

Similarly by reading a corrected or compass course on the inner dial ring, the corresponding true course direction or angular designation, can be obtained on the outer dial ring.

Where the inner dial ring is set in a position, in which the zero designation 22 thereon is aligned with the zero designation on the outer dial ring, the variation correction is introduced by rotating the intermediate dial ring until the proper reading, as for example 20 degree West variation, appears through the inner left-hand cut-out 41 in the outer central disc. Similarly, the deviation correction is established by rotating the inner dial ring 16, by means of the deviation tab 35, until the required deviation correction appears through the outer left-hand cut-out in the central disc, as for example 15 degree West deviation. The required relation between the inner and outer dial rings 16, 14 is thus established. By reading the corrected compass course angle on the inner dial ring, at for example 90 degrees, the navigator obtains his corresponding true course direction on the outer dial ring, the true course direction being 55 degrees.

Figure 2:
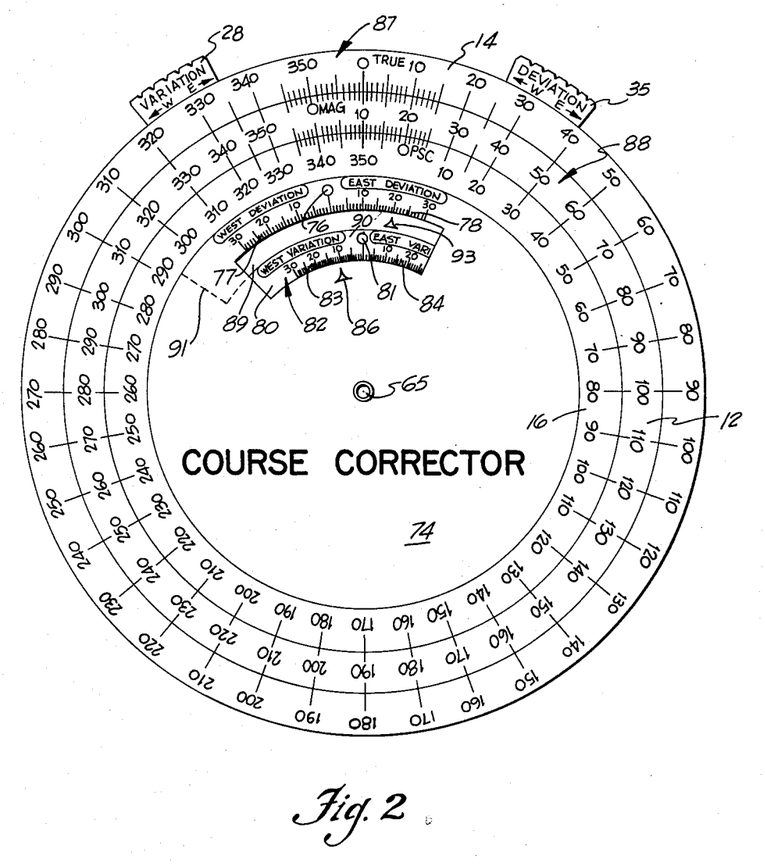
FIGURE 2 is a plan view of a modification of the course corrector device, shown in FIGURE 1, with a single central adjustment indicator cut-out, used in place of the two angular cut-outs shown in FIGURE 1.

FIGURE 2 shows a modification of the course corrector shown in FIGURE 1. This is essentially the same as that shown in FIGURE 1, except that the correction angles appear at the upper portion of the outer central disc 74, which is fixedly attached to the intermediate dial ring 12.

A zero designation 76 which may be aligned with the zero designation on the outer dial ring 14 is printed or engraved on the outer surface of the outer central disc 74, adjacent the outer circumference thereof. Angle graduations 77 ranging from zero degrees to 30 degrees, are printed or engraved on the left-hand side of the zero designation, to indicate the West deviation correction, and corresponding graduations 78, ranging from 0 degree to 30 degrees imprinted on the right-hand side of the zero designation. The words "West Deviation" and "East Deviation," or corresponding abbreviations, may be imprinted around the graduations 77 and 78 as shown in FIGURE 2.

A circular segmental cut-out or opening 80 is cut through the upper portion of the outer central disc 74, the opening extending from a point a short distance beyond the 30 degree West deviation angle to a point slightly beyond the 30 degree East deviation angle graduation, in order to clearly indicate the angles of maximum variation and deviation.

At a radial position coinciding with the lower portion of the cut-out 80 and visible therethrough, a zero variation designation 81, is imprinted on an inner central disc 82, which is attached to the base disc 57 in a manner similar to that shown in FIGURE 1.

Variation correction graduations 83, ranging from zero degrees to 30 degrees, and corresponding numerals are imprinted on the inner central disc at the left-hand side of the zero designation 81, to indicate the West variation corrections, these graduations being aligned with and visible through the central opening 80 through the outer central disc 74.

Similarly East variation corrections 84, ranging from 0 to 30 degrees are correspondingly imprinted on the inner central disc 82, the graduations being radially aligned with the West variation graduations.

An arrow 86 is imprinted in the surface of the outer central disc 74 at a point adjacent the bottom curve of the central opening 80 to indicate the position of the variation corrections relative to the true course reading on the outer dial ring 14.

The outer dial ring and disc combination 87 is substantially the same as that shown in FIGURE 1, except for the small inner central disc 82, which is attached to the base disc 57, the variation graduations 83, 84, being imprinted on the face of the inner central disc 82.

The intermediate ring and disc combination 88, is substantially the same as that shown in FIGURE 1, except for the outer central disc 74, which has a circular segmental cut-out therethrough, the deviation graduations 77, 78 being imprinted on the outer surface of the disc, adjacent the outer circumference thereof.

The intermediate ring dial 12, is substantially the same as that shown in FIGURE 1.

The inner dial ring and disc combination is similar to that shown in FIGURE 1, the inner dial ring 16, having a circular backing ring 89 partially attached thereto.

The backing ring has a central opening 90, therethrough to clear and fit around the inner central disc 82, which is attached to the base disc 57.

The circumferential outer portion of the backing ring has a circular segmental cut-out therethrough, the cut-out extending from a radial edge 91, which serves as a stop for the variation tab 28 attached to the intermediate ring and disc combination, to the left-hand edge of the deviation tab 35 attached to the inner dial ring and disc combination, the left-hand edge of the deviation tab, serving as a stop for the variation tab, at the right-hand or eastern end of its movement.

An arrow 93 is imprinted on the backing ring 89, radially inside the East and West Deviation correction graduations 77, 78 on the outer central disc 74, to indicate the deviation correction introduced, when the inner dial ring 16 is rotated to its adjusted position.

The method of assembling the intermediate ring and disc combination to the outer, or true course ring and disc combination, is substantially the same as those shown in FIGURE 1.

The stops for limiting the angular movement of the intermediate dial ring, and the inner dial ring 16, relative to the outer, or true course dial ring, are substantially the same as those shown in FIGURE 1, and in the detailed constructions, shown in FIGURES 3 to 8.

The operation of the modified device shown in FIGURE 2, is substantially the same as that shown in FIGURE 1, except that the corrections are visible either on the outer central disc 74 or through the central opening 80, through the outer central disc 74.

Thus a variation correction is introduced by rotating the intermediate dial ring 12 by means of the variation tab 28, until the required variation correction angle, East or West, appears through the central opening 80 through the outer central disc 74, the arrow 86 indicating the required correction on the graduations 83, 84, which are imprinted on the inner central disc.

Similiarly, the deviation correction, East or West, is introduced by rotating the inner dial ring, and the arrow 93 imprinted on the backing ring 89 attached to the inner dial ring 16, until the arrow 93 indicates the required deviation corrections, East or West, on the graduations 77, 78 imprinted on the outer central outer disc 74.

This establishes the combination correction, which may, for example be 35 degrees East.

By reading the required true course angle, as for example 270 degrees on the outer dial ring, the corresponding corrected compass course angle, or 235 degrees is read on the inner dial ring.

Similarly, if a navigator starts with a compass course angle of for example 180 degrees on the inner dial ring, and desires to establish the corresponding true course angle, assuming the same corrections hereinbefore established, or a combination correction of 35 degrees East, the navigator will read on the true course, or outer dial ring 14, the corresponding true course reading, or 215 degrees, on the radial line corresponding to the 180 degree line on the inner dial ring.

This gives the true course reading corresponding to the compass course reading which was introduced, after introducing the required corrections.

In all other respects, the modified device shown in FIGURE 2, is substantially the same in construction and operation, as that shown in FIGURE 1, and hereinbefore described.

It will be apparent to those skilled in the art that the present invention is not limited to the specific details described above and shown in the drawings, and that various modifications are possible in carrying out the features of the invention and the operation, adjustment, co-ordination and method of utilization thereof, without departing from the spirit and scope of the appended claims.

What I claim is:

1. A course corrector comprising a relatively thin flat outer dial ring, an intermediate dial ring concentric with the outer dial ring and rotatably fitted to the inner diameter of the outer dial ring, an inner dial ring having a central opening therethrough, concentric with the outer dial ring, and rotatably fitted to the inner diameter of the intermediate dial ring, an angularly positioned control tab fixedly attached to the inner dial ring, each of said dial rings having angle graduations ranging from 0 to 360 degrees reproduced thereon, a flat base disc attached to the outer dial ring adapted to rotatably support the intermediate and inner dial rings, a central disc concentric with the inner dial ring, means fixedly attaching the intermediate dial ring to the central disc, the central disc being rotatably supported by the base disc attached to the outer dial ring, a pair of stops adapted to limit the rotational angular movement of the intermediate dial ring, through a limited angular range in both directions, relative to the zero angular designation on the outer dial ring, a second pair of radially positioned stops adapted to limit the rotational angular movement of the inner dial ring, through a limited angular range, relative to the zero angular marker on the intermediate dial ring in both directions, means visible on said central disc, adapted to indicate the rotational angular movement of the intermediate dial ring, from the zero angular marker on the outer dial ring, in both directions, within the angular range established by the stops limiting the movement of the intermediate dial ring, and means visible on said central disc adapted to indicate the rotational angular movement of the inner dial ring from the zero angular marker on the intermediate dial ring, in both directions, within the angular range of the stops limiting the movement of the inner dial ring, the support means attached to the outer dial ring being a thin substantially circular disc, the outer diameter of the support disc being substantially equal to the outer diameter of the outer dial ring, a thin separator ring mounted between the outer dial ring and the support disc, the separator ring extending around a portion of the circumference of the outer dial ring, the separator ring being fixedly attached to the outer dial ring and the support disc, the area of the outer dial ring extending between the ends of the separator ring being relatively free of the outer dial ring, the means fixedly attaching the central disc to the intermediate dial ring being adapted to fit into the free area between the support disc and the outer dial ring, to retain the intermediate dial ring in its relation to the outer dial ring, said retaining means being adapted to engage the first end of the separator ring to limit the rotational angular movement of the intermediate dial ring in one direction, control means attached to the inner dial ring adapted to extend through the free area between the support disc and the outer dial ring, to limit the rotational angular movement of the inner dial ring in both directions, said control means being adapted to engage the end of the separator ring, opposite the first and thereof, to limit the rotational angular movement of the inner dial ring in one direction.

2. A course corrector as in claim 1, in which the means attached to the intermediate dial ring fitted into the area between the support disc and the outer dial ring is a first radially positioned tab, extending radially outward from the central disc to a radial position beyond the outer circumference of the outer dial ring, said first control tab being fixedly attached to the central disc and the intermediate dial ring respectively, to operatively connect the intermediate dial ring with the central disc, said first control tab being adapted to manually control the rotational angular movement of the intermediate dial ring in both directions, relative to the zero designation on the outer dial ring, a second radially positioned control tab attached to the inner dial ring, said second radially positioned control tab extending radially outward beyond the outer circumference of the outer dial ring, the second tab being adapted to manually control the angular movement of the inner dial ring, in both directions relative to the zero designation on the intermediate dial ring.

3. A course corrector, as in claim 1, in which an inner disc of circular contour is fixedly attached to the support means attached to the outer dial ring, said inner disc being concentric with the outer dial ring, the outer diameter of the inner disc being smaller than the outer diameter of the central disc.

4. A course corrector, in claim 1, in which an inner disc of circular contour is fixedly attached to the support disc attached to the outer dial ring, said inner disc being concentric with the outer dial ring, the outer diameter of the inner disc being smaller than the outer diameter of the central disc, the inner dial ring having a backing ring fitted thereto, between the surface of the inner dial ring and the corresponding surface of the support disc, a portion of the circumferential surface of the inner dial ring being attached to the backing ring, the balance of the circumferential surface of the inner dial ring being free of the backing ring, said backing ring having a central opening therethrough adapted to fit over the outer circumference of the inner disc in the mounted position, said backing ring having a circular segmental cutout through the outer circumference thereof, said cutout extending over an angular range from the zero designation on the inner dial ring, in both directions, the second radially positioned control tab being attached to the inner dial ring, said tab extending radially outward from the inner dial ring to a point beyond the outer circumference of the outer dial ring, said tab being adapted to manually control the rotational angular movement of the inner dial ring, in both directions relative to the zero designation on the intermediate dial ring.

5. A course corrector as in claim 1, in which an inner disc of circular contour is fixedly attached to the support disc attached to the outer dial ring, said inner disc being concentric with the outer dial ring, the outer diameter of the inner circular disc being smaller than the outer diameter of the central disc, the inner dial ring having a backing ring fitted thereto, between the surface of the inner dial ring and the corresponding surface of the support disc, a portion of the circumferential surface of the inner dial ring being attached to the backing ring, the balance of the circumferential surface of the inner dial ring being free of the backing ring, said backing ring having a control opening therethrough adapted to fit over the outer circumference of the inner disc, in the mounted position, said backing ring having a circular segmental cutout through the outer circumference thereof, said cutout extending over an angular range from the zero designation on the inner dial ring, in both directions, the control means attached to the inner dial ring being a tab integral with the backing ring, said tab extending radially outward from the backing ring to a point beyond the outer circumference of the outer dial ring, said tab being adapted to manually control the rotational angular movement of the inner dial ring, in both directions, relative to the zero designation on the intermediate dial ring, said central disc having a first pair of radially aligned inner and outer openings therethrough, near the outer circumference thereof, said central disc having a second pair of radially aligned inner and outer openings therethrough, the second pair of inner and outer openings being substantially diametrically aligned with the first pair of openings, a central designation reproduced on said central disc, at substantially the center of each outer opening, a second central designation reproduced on said central disc, at substantially the center of each inner opening, each of said radially positioned inner and outer openings being of circular segmental form extending over a relatively short angular range, said backing ring having a first range of angular graduations reproduced thereon, said graduations being visible through the adjacent outer opening, when the inner dial ring is rotated in one direction, said backing ring having a second range of angular graduations reproduced thereon, said graduations being visible through the opening in the central disc opposite that through which the first range of graduations is visible, when the inner dial ring is rotated in a direction opposite the direction of rotation for the first range of graduations, said inner disc having a first range of angular graduations reproduced thereon, said graduations being visible through the adjacent inner opening through the central disc, when the central disc is rotated through a limited angle in a direction corresponding to the direction through which the inner dial ring is rotated to render the first range of angular graduations visible, said inner disc having a second range of angular graduations reproduced thereon, said graduations being visible through the inner opening opposite the opening through which the first range of angular graduations on the inner disc is visible, when the central disc is rotated through a limited angle in a direction corresponding to the direction of rotation through which the inner dial ring is rotated to render the second group of angular graduations on the backing ring visible.

6. A course corrector, as in claim 1, in which an inner disc of circular contour is fixedly attached to the support disc attached to the outer dial ring, said inner disc being concentric with the outer dial ring, the outer diameter of the inner circular disc being smaller than the outer diameter of the central disc, the inner dial ring having a backing ring fitted thereto, between the surface of the inner dial ring and the corresponding surface of the support disc, a portion of the surface of the inner dial ring being attached to the backing ring, the balance of the circumferential surface of the inner dial ring being free of the backing ring, said backing ring having a central opening therethrough, adapted to fit over the outer circumference of the inner disc in the mounted position, said backing ring having a circular segmental cutout through the outer circumference thereof, said cutout extending over a limited angular range, the means adapted to attach the intermediate dial ring to the central disc being a radially positioned first tab attached to the intermediate dial ring, said tab extending radially outward, beyond the outer circumference of the outer dial ring, said tab being attached to the central disc to operatively connect the central disc to the intermediate dial ring, the control means attached to the inner dial ring being a second tab integral with the backing ring, extending radially outward beyond the outer circumference of the outer dial ring, said second tab being fixedly attached to the inner dial ring, one end of said cutout being a radial line adapted to serve as a stop to limit the rotational angular movement of the first tab attached to the intermediate dial ring in one direction, one edge of the second radial tab serving as the opposite end of the circular segmental cutout, said first tab being adapted to manually control the rotational angular movement of the intermediate dial ring, relative to the zero designation on the outer dial ring, in both directions, the second tab being adapted to control the rotational angular movement of the inner dial ring through a limited angular range relative to the zero designation on the intermediate dial ring, in both directions, said central disc having a circular segmental opening therethrough, the ends of said circular segmental opening being angularly equidistant relative to the zero designation on the outer dial ring, a portion of the backing ring being visible through the circular segmental opening, the portion of the backing ring visible through said opening having an indicator designation thereon, said indicator designation being nominally radially aligned with the zero designation on the outer dial ring, the outer surface of the central disc, adjacent the circular segmental opening having angular graduations reproduced thereon in both directions, centering about a zero degree angular marker on said central disc, the range of said angular graduations corresponding to the range of rotational angular movement of the inner dial ring, the indicator designation on the backing ring indicating the angular movement of the inner dial ring on said graduations on the central disc, the portion of the inner disc visible through the circular segmental opening having angular graduations reproduced thereon, ranging equally in both directions relative to a central zero designation, the central zero angular marker being nominally aligned with the zero angular marker on the outer dial ring, the surface of the central disc, adjacent the inner edge of the circular segmental opening therethrough, having an indicator designation thereon, the indicator designation being nominally radially aligned with the zero designation on the outer dial ring, the angle graduations on the inner disc indicating the rotational angular movement of the intermediate dial ring and the central disc relative to the zero designation on the outer dial ring, the indicator designation on the central disc indicating the precise rotational angular movement of the intermediate dial ring, on the graduations on the inner dial ring visible through the circular segmental opening.

7. A navigation course corrector, comprising a relatively thin flat outer dial ring of circular contour, said outer dial ring having an opening of substantially circular contour through the center thereof, an intermediate dial ring concentric with the outer dial ring and rotatably fitted to the central opening through the outer dial ring, said intermediate dial ring having a circular opening through the center thereof, concentric with the outer diameter of the intermediate dial ring, an inner dial ring, having a central opening therethrough, concentric with the outer dial ring, rotatably fitted to the central opening through the intermediate dial ring, each of said dial rings having angle graduations ranging from 0 degree to 360 degrees reproduced thereon, a substantially circular disc attached to the outer dial ring, adapted to rotatably support the intermediate and inner dial rings, a substantially circular central disc concentric with the inner dial ring, rotatably fitted to the central opening through the inner dial ring, means fixedly attaching the central disc to the intermediate dial ring, means inserted through the central disc adapted to rotatably support the central disc from the circular support disc attached to the outer dial ring, the outer dial ring having a zero angular marker reproduced thereon, said zero angular marker coinciding radially with the zero degree angular graduation on the outer dial ring, said intermediate dial ring, and the inner dial ring each having a zero angular marker reproduced thereon, said zero angular marker being in nominal radial alignment with the zero angular marker on the outer dial ring, a pair of angularly positioned stops adapted to limit the rotational angular movement of the intermediate dial ring through a limited angular range in both directions, relative to the zero angle designation on the outer dial ring, a pair of radially positioned stops adapted to limit the rotational angular movement of the inner dial ring through a limited angular range, in both directions, relative to the zero angle designation on the intermediate dial ring, means visible on said central disc adapted to indicate the rotational angular movement of the intermediate dial ring from the zero designation on the outer dial ring, in both directions, within the angular range established by the stops controlling the intermediate dial ring, and means visible on said central disc adapted to indicate the rotational angular movement of the inner dial ring relative to the intermediate dial ring, as measured from the zero designation on the intermediate dial ring, in both directions, within the angular range of the stops controlling the rotational angular movement of the inner dial ring, an inner disc of circular contour being fixedly attached to the support disc of the outer dial ring, said inner disc being concentric with the outer dial ring, the outer diameter of the inner circular disc being smaller than the outer diameter of the central disc, the inner dial ring having a backing ring fitted thereto, between the surface of the inner dial ring and the mating surface of the support disc, a portion of the circumferential surface of the inner dial ring being attached to the backing ring, the balance of the circumferential surface of the inner dial ring being free of the backing ring, said backing ring having a central opening therethrough, adapted to fit over the outer circumference of the inner disc in the mounted position, said backing ring having a circular segmental cutout through the outer circumference thereof, said cutout extending over an angular range relative to the zero marker on the inner dial ring, in both directions, a tab integral with the backing ring, said tab extending radially outward from the backing ring to a point beyond the outer circumference of the outer dial ring, said tab being adapted to manually control the rotational angular movement of the inner dial ring, in both directions, relative to the zero angular marker on the intermediate dial ring, the angle graduations on the outer dial ring representing true course navigational directions, the angular offset of the intermediate ring relative to the zero angular marker on the outer dial ring representing a first angle course correction, the angular offset of the inner dial ring relative to the zero angular marker on the intermediate dial ring representing a second angle course correction, said central disc having means formed thereon adapted to indicate the rotational angular position of the intermediate dial ring relative to the zero angular marker on the outer dial ring, corresponding to the first course correction, said central disc having additional means formed thereon adapted to indicate the angular offset of the inner dial ring relative to the zero angular marker on the intermediate dial ring, to indicate the second course correction, the angle graduation on the inner dial ring when angularly adjusted representing compass course angular directions, the angle graduations on the outer dial ring determined by a radial line from a selected angle graduation on the inner dial ring representing the true course direction, corresponding to a selected compass course direction, the angle graduation on the inner dial ring, determined by a radial line from a selected graduation on the outer dial ring representing the compass course direction, corresponding to a selected true course direction.

8. A course corrector as in claim 7, in which said central disc having a pair of radially aligned inner and outer openings therethrough near the outer circumference of said disc, said central disc having a second pair of radially aligned inner and outer openings therethrough, the second pair of inner and outer openings being substantially diametrically aligned with the first pair of openings, a central designaton reproduced on sad central disc as substantially the center of each outer opening, a second central designation reproduced on said central disc, at substantially the center of each inner opening, each of said radially aligned inner and outer openings being of circular segmental form, and extending over a relatively short angular range, said backing ring having a first range of angular graduations reproduced thereon, said angular graduations being visible through the adjacent outer opening through the central disc when the inner dial ring is rotated in one direction, said graduatons, co-acting with the corresponding outer central designation being adapted to indicate the extent of the angular movement of the inner dial ring relative to the zero designation on the intermediate dial ring in one direction, said backing ring having a second range of angular graduations reproduced thereon, said graduations being visible through the outer cutout in the central disc, opposite that through which the first range of angular graduations is visible, said second range of angular graduations being adapted to indicate the extent of the angular offset of the inner dial ring, relative to the zero designation on the intermediate dial ring, in a direction opposite that indicated by the first range of graduations, said inner disc having a first range of angle graduations reproduced thereon, said graduations being visible through the adjacent inner opening through the central disc, when the intermediate dial ring and the central disc are rotated through a limited angular range to introduce a first angle correction, the reading on said first range of angular graduations on the inner disc corresponding to the first angle correction position of the central disc and the intermediate dial ring, said inner disc having a second range of angular graduations reproduced thereon, said graduations being visible through the inner opening opposite the opening through which the first range of angular graduations on the inner disc is visible, when the intermediate dial ring and the central disc are rotated through a limited angular range, the readings on said second range of graduations on the inner disc, corresponding to the angle correction position of the central disc, and the intermediate dial ring, the angular graduations through the outer openings representing the second angle course correction of the inner dial ring, relative to the intermediate dial ring, the angle graduations on the inner dial ring when angularly adjusted representing compass course angular corrections.

9. A course corrector as in claim 7, in which a radially positioned first tab, attached to the intermediate dial ring, said tab extending radially outward beyond the outer circumference of the outer dial ring, said first tab being fixedly attached to the intermediate dial ring to operatively connect the central disc to the intermediate dial ring, a second tab integral with the backing ring, said second tab extending radially outward from the backing ring to a point beyond the outer circumference of the outer dial ring, said first tab being adapted to manually control the rotational angular movement of the intermediate dial ring, relative to the zero designation on the outer dial ring, said second tab being adapted to manually control the rotational angular movement of the inner dial ring, in both directions, relative to the zero designation on the intermediate dial ring, one end of the cutout in the backing ring being a radial line adapted to serve as a stop to limit the rotational angular movement of the first tab attached to the intermediate dial ring in one direction, one edge of the second radial tab serving as the opposite end of the circular segmental cutout through the backing ring, the graduations on the outer dial ring representing true course navigational directions, the angular offset of the intermediate dial ring relative to the zero designation on the outer dial ring representing a first angle course correction, the angular offset of the inner dial ring relative to the zero designation on the intermediate dial ring representing a second angle course correction, said central disc having a pair of radially aligned inner and outer openings therethrough near the outer circumference of said central disc, said central disc having a second pair of radially aligned inner and outer openings therethrough, the second pair of inner and outer openings being substantially diametrically aligned with the first pair of openings, a central designation reproduced on said central disc at substantially the center of each outer opening, a second central designation reproduced on said central disc, at substantially the center of each inner opening, each of said radially aligned inner and outer openings being of circular segmental form, extending over a relatively short angular range, said backing ring having a first range of angular graduations reproduced thereon, said angular graduations being visible through the adjacent outer opening through the central disc, when the inner dial ring is rotated in one direction, said graduation co-acting with the corresponding outer central designation being adapted to indicate the extent of the angular movement of the inner dial ring relative to the zero designation on the intermediate dial ring, in one direction, said backing ring having a second range of angular graduations reproduced thereon, said graduations being visible through the outer cutout in the central disc, opposite that through which the first range of angular graduations is visible, said second range of graduations being adapted to indicate the extent of the angular offset of the inner dial ring, relative to the zero designation on the intermediate dial ring, in a direction opposite that indicated by the first range of angular graduations, said inner disc having a third range of angle graduations reproduced thereon, said graduations being visible through the adjacent inner opening through the central disc, when the intermediate dial ring and the central disc are rotated through a limited angular range to introduce a first angle correction, the reading on said first range of graduations on the inner disc corresponding to the first angle correction position of the intermediate dial ring, said inner disc having a second range of angular graduations reproduced thereon, said graduations being visible through the inner opening opposite the opening through which the first range of angular graduations on the inner disc, is visible, when the intermediate dial ring and the central disc are rotated through a limited angular range to introduce a first angle course correction in the opposite direction, the readings on said second range of graduations on the inner disc, corresponding to the first angle correction position of the intermediate dial ring, the angular graduations visible through the outer openings through the disc representing the second angle course correction, of the inner dial ring, relative to the intermediate dial ring, the angle graduations on the inner dial ring when angularly adjusted representing compass course directions.

10. A course corrector as in claim 7, in which a radially positioned first tab attached to the intermediate dial ring, said first tab extending radially outward beyond the outer dial ring, said first tab being attached to the central disc to operatively connect the central disc to the intermediate dial ring, a second tab, integral with the backing ring extending radially outward beyond the outer circumference of the outer dial ring, said second tab being fixedly attached to the inner dial ring, one end of said cutout being a radial line adapted to serve as a stop to limit the rotational angular movement of the first tab attached to the intermediate dial ring, in one direction, one edge of the second radial tab serving as the opposite end of the circular segmental cutout, said first tab being adapted to manually control the rotational angular movement of the intermediate dial ring, relative to the zero designation on the outer dial ring, the second tab being adapted to control the rotational angular movement of the inner dial ring, through a limited angular range relative to the zero designation on the intermediate dial ring, in both directions, said central disc having a circular segmental central opening therethrough, the ends of said circular segmental opening being angularly equidistant relative to the zero designation on the outer dial ring, a portion of the backing ring being visible through the circular segmental opening, the portion of the backing ring visible through said circular segmental opening having an indicator designation reproduced thereon, said indicator desgnation being nominally radially aligned with the zero designation on the outer dial ring, the outer surface of the central disc, adjacent the circular segmental opening having angular graduations thereon in both directions, centering about a zero designation on said central disc, the range of said angular graduations corresponding to the range of rotational angular movement of the inner dial ring, the momentary angular position of the angular graduations relative to the indicator designation on the backing ring being adapted to indicate the second angle course correction by the inner dial ring relative to the intermediate dial ring, the portion of the inner disc visible through the circular segmental opening having angular graduations reproduced thereon, ranging equally in both directions, relative to a central zero designation, the central zero designation being nominally radially aligned with the zero designation on the outer dial ring, the surface of the central disc, adjacent the inner edge of the circular segmental opening therethrough, having an indicator designation thereon, the indicator designation being nominally radially aligned with the zero designation on the outer dial ring, the angular graduations on the inner disc indicating the nominal first angle correction, representing the angular offset of the intermediate dial ring relative to the zero designation on the outer dial ring.

References Cited in the file of this patent

UNITED STATES PATENTS

| | | |
|---|---|---|
| 765,426 | Herrick | July 19, 1904 |
| 1,104,844 | Sundell | July 28, 1914 |
| 1,311,641 | Christensen | July 29, 1919 |
| 1,949,946 | Viehmann | Mar. 6, 1934 |
| 2,253,279 | Loew | Aug. 19, 1941 |
| 2,477,556 | Shaw | July 26, 1949 |